(12) United States Patent
Gaeta et al.

(10) Patent No.: US 10,423,938 B1
(45) Date of Patent: Sep. 24, 2019

(54) IDENTIFYING NEGOTIABLE INSTRUMENT FRAUD USING DISTRIBUTED LEDGER SYSTEMS

(71) Applicant: UIPCO, LLC, San Antonio, TX (US)

(72) Inventors: Michael Joseph Gaeta, San Antonio, TX (US); Alexander B. Nagelberg, San Antonio, TX (US); Joseph Matthew Doddato, Boerne, TX (US); Steven J. Schroeder, Oak Point, TX (US); Michael L. Hertz, San Antonio, TX (US); Hudson R. Jameson, Aubrey, TX (US); Gunjan C. Vijayvergia, San Antonio, TX (US); Bharat Prasad, San Antonio, TX (US); Darrius M. Jones, San Antonio, TX (US)

(73) Assignee: United Services Automobile Association, San Antonio, TX (US)

( * ) Notice: Subject to any disclaimer, the term of this patent is extended or adjusted under 35 U.S.C. 154(b) by 297 days.

(21) Appl. No.: 15/431,167

(22) Filed: Feb. 13, 2017

Related U.S. Application Data

(63) Continuation-in-part of application No. 15/354,660, filed on Nov. 17, 2016.
(Continued)

(51) Int. Cl.
*G06Q 20/04* (2012.01)
*G06Q 20/40* (2012.01)
*G06K 19/06* (2006.01)

(52) U.S. Cl.
CPC ..... *G06Q 20/042* (2013.01); *G06K 19/06037* (2013.01); *G06Q 20/4016* (2013.01)

(58) Field of Classification Search
USPC .......................................................... 705/45
See application file for complete search history.

(56) References Cited

U.S. PATENT DOCUMENTS 7,980,460 B1 * 7/2011 Harroff ............... G06Q 20/042
235/379
9,779,392 B1 * 10/2017 Prasad ............... G06Q 20/0425
(Continued)

FOREIGN PATENT DOCUMENTS

AU      2016101183 A4    9/2016
CN      105681301 A      6/2016
(Continued)

OTHER PUBLICATIONS

Understanding Modern Banking Ledgers through Blockchain Technologies: Future of Transaction Processing and Smart Contracts on the Internet of Money Gareth W. Petersz, Efstathios Panayiy Nov. 19, 2015.*

*Primary Examiner* — William E Rankins
(74) *Attorney, Agent, or Firm* — Fletcher Yoder, P.C.

(57) ABSTRACT

Methods, systems, and apparatus, including computer programs encoded on a computer storage medium, for receiving first information of a first negotiable instrument, at least a portion of the first information including a first unique instrument identifier physically encoded on the first negotiable instrument, the first unique identifier uniquely identifying the first negotiable instrument among a plurality of negotiable instruments, transmitting the first information to a distributed ledger system, the distributed ledger system maintaining a blockchain that records transactions associated with a plurality of negotiable instruments, receiving first validation information from the distributed ledger system, the first validation information indicating that first negotiable instrument has not already been accepted, and accepting the first negotiable in response to the first validation information.

18 Claims, 10 Drawing Sheets

Related U.S. Application Data

(60) Provisional application No. 62/257,902, filed on Nov. 20, 2015.

(56) References Cited

U.S. PATENT DOCUMENTS

| | | | | |
|---|---|---|---|---|
| 2001/0039534 | A1* | 11/2001 | Keene | G06Q 20/042 705/45 |
| 2004/0122754 | A1* | 6/2004 | Stevens, III | G06Q 20/042 705/35 |
| 2005/0125351 | A1* | 6/2005 | Tidwell | G06Q 20/042 705/42 |
| 2009/0261158 | A1* | 10/2009 | Lawson | G07D 7/0047 235/379 |
| 2010/0006643 | A1* | 1/2010 | Epstein | G06Q 20/04 235/379 |
| 2013/0173476 | A1* | 7/2013 | Sayers | G06Q 20/042 705/71 |
| 2015/0332395 | A1 | 11/2015 | Walker et al. | |
| 2015/0363770 | A1 | 12/2015 | Ronca et al. | |
| 2015/0363777 | A1 | 12/2015 | Ronca et al. | |
| 2015/0363778 | A1 | 12/2015 | Ronca et al. | |
| 2015/0363782 | A1 | 12/2015 | Ronca et al. | |
| 2015/0363783 | A1 | 12/2015 | Ronca et al. | |
| 2015/0379510 | A1 | 12/2015 | Smith | |
| 2016/0203477 | A1 | 7/2016 | Yang et al. | |
| 2016/0224977 | A1 | 8/2016 | Sabba et al. | |
| 2016/0234026 | A1 | 8/2016 | Wilkins et al. | |
| 2016/0253663 | A1 | 9/2016 | Clark et al. | |
| 2016/0260169 | A1 | 9/2016 | Arnold et al. | |
| 2016/0321622 | A1* | 11/2016 | Gardner | G06Q 20/042 |
| 2016/0321751 | A1 | 11/2016 | Creighton, IV et al. | |
| 2016/0321752 | A1 | 11/2016 | Tabacco et al. | |
| 2016/0328713 | A1 | 11/2016 | Ebrahimi | |
| 2016/0342978 | A1 | 11/2016 | Davis et al. | |
| 2016/0342989 | A1 | 11/2016 | Davis | |
| 2017/0046698 | A1* | 2/2017 | Haldenby | G06Q 20/0655 |
| 2017/0053249 | A1 | 2/2017 | Tunnell et al. | |
| 2017/0076280 | A1 | 3/2017 | Castinado et al. | |
| 2017/0076286 | A1 | 3/2017 | Castinado et al. | |
| 2017/0078299 | A1 | 3/2017 | Castinado et al. | |
| 2017/0091397 | A1 | 3/2017 | Shah | |
| 2017/0103391 | A1 | 4/2017 | Wilson, Jr. et al. | |
| 2017/0109748 | A1 | 4/2017 | Kote | |
| 2017/0132625 | A1 | 5/2017 | Kennedy | |
| 2017/0132626 | A1 | 5/2017 | Kennedy | |
| 2017/0132630 | A1 | 5/2017 | Castinado et al. | |
| 2017/0140145 | A1 | 5/2017 | Shah | |
| 2017/0140375 | A1 | 5/2017 | Kunstel | |
| 2017/0178237 | A1 | 6/2017 | Wong | |
| 2017/0228704 | A1 | 8/2017 | Zhou et al. | |
| 2017/0230353 | A1 | 8/2017 | Kurian et al. | |
| 2017/0230375 | A1 | 8/2017 | Kurian | |
| 2017/0236121 | A1 | 8/2017 | Lyons et al. | |
| 2017/0243025 | A1 | 8/2017 | Kurian et al. | |
| 2017/0243177 | A1 | 8/2017 | Johnsrud et al. | |
| 2017/0243208 | A1 | 8/2017 | Kurian et al. | |
| 2017/0243209 | A1 | 8/2017 | Johnsrud et al. | |
| 2017/0243212 | A1 | 8/2017 | Castinado et al. | |
| 2017/0243286 | A1 | 8/2017 | Castinado et al. | |
| 2017/0244707 | A1 | 8/2017 | Johnsrud et al. | |
| 2017/0244757 | A1 | 8/2017 | Castinado et al. | |
| 2017/0270527 | A1 | 9/2017 | Rampton | |
| 2017/0286951 | A1 | 10/2017 | Ignatchenko et al. | |
| 2017/0287068 | A1 | 10/2017 | Nugent | |
| 2019/0043023 | A1* | 2/2019 | Kurian | G06Q 20/401 |

FOREIGN PATENT DOCUMENTS

| | | |
|---|---|---|
| CN | 106204287 A | 12/2016 |
| CN | 106408299 A | 2/2017 |
| CN | 106506493 A | 3/2017 |
| CN | 106600401 A | 4/2017 |
| CN | 106611372 A | 5/2017 |
| CN | 106682528 A | 5/2017 |
| KR | 20160150278 A | 12/2016 |
| KR | 101701131 B1 | 2/2017 |
| KR | 20170040079 A | 4/2017 |
| KR | 101762245 B1 | 7/2017 |
| WO | 2016175914 A2 | 11/2016 |
| WO | 2017022917 A1 | 2/2017 |
| WO | 2017027900 A1 | 2/2017 |
| WO | 2017066002 A1 | 4/2017 |
| WO | 2017091530 A1 | 6/2017 |
| WO | 2017136956 A1 | 8/2017 |
| WO | 2017139688 A1 | 8/2017 |
| WO | 2017146333 A1 | 8/2017 |

* cited by examiner

Check Validation — 302

Routing No.: — 306

Account No.: — 308

Check No.: — 310

Amount: — 312

[Exists?] — 314

Check Hash: — 316

Already Deposited: — 318

Created On: — 320

Created By: — 322

[Create] — 324

Check Validation — 302

Routing No.: — 306
1234567

Account No.: — 308
1234567890

Check No.: — 310
1001

Amount: — 312
1275.00

[ Exists? ] — 314

---

Check Hash: — 316

Already Deposited: — 318

Created On: — 320

Created By: — 322

[ Create ] — 324

Check Validation — 302

Routing No.: — 306
1234567

Account No.: — 308
1234567890

Check No.: — 310
1001

Amount: — 312
1275.00

[ Exists? ] — 314

---

Check Hash: — 316
af75054e468de9b0bc4c2bceaae1ac1c8ef16ce4a9c8b1735b02dc27ba7f4270

Already Deposited: — 318
True

Created On: — 320
July 30, 2015 | 0945

Created By: — 322
Bank-is-Us

[ Create ] — 324

Check Validation — 302

Routing No.: — 306
784432

Account No.: — 308
7763542

Check No.: — 310
21

Amount: — 312
300.00

Exists? — 314

Check Hash: — 316

Already Deposited: — 318

Created On: — 320

Created By: — 322

Create — 324

Check Validation — 302

Routing No.: — 306
784432

Account No.: — 308
7763542

Check No.: — 310
21

Amount: — 312
300.00

Exists? — 314

Check Hash: — 316
80da6bb273732a25b382e166d55a46d520cd210a081496856b761c1b6bb94004

Already Deposited: — 318
True

Created On: — 320
July 30, 2015 | 1332

Created By: — 322
We-R-Banks

Create — 324

IDENTIFYING NEGOTIABLE INSTRUMENT FRAUD USING DISTRIBUTED LEDGER SYSTEMS

CROSS-REFERENCE TO RELATED APPLICATIONS

This application claims the benefit of and is a continuation-in-part of U.S. application Ser. No. 15/354,660, filed on Nov. 17, 2016, which claims priority to U.S. Application Ser. No. 62/257,902, filed on Nov. 20, 2015, the disclosures of which are incorporated herein by reference in their entireties.

BACKGROUND

Negotiable instruments are documents that guarantee payment of a specific amount of money. In some examples, a negotiable instrument can be described as a contract that promises payment of money without condition, which may be paid either on demand or at a future date. In general, an instrument is a negotiable instrument if it is a written instrument signed by an endorser (or maker), includes an unconditional promise to pay a certain amount of money, either on demand or at a future date, and is payable to the holder (or bearer). A person who becomes a holder in due course of a negotiable instrument by delivery, or by delivery and endorsement, has an unrestricted claim to the negotiable instrument. Example negotiable instruments include promissory notes, bills of exchange, banknotes, and checks.

Fraud can be perpetrated based on negotiable instruments. For example, and with reference to checks, a fraudster can present a check for payment at multiple financial institutions. For example, the fraudster can electronically deposit a check with a first financial institution (e.g., mobile deposit of the check using a banking application executing on a smartphone), and can physically deposit the same check at a second financial institution (e.g., visit a branch and deposit the check with a teller). It can be weeks or months before the multiple deposits of the same check are discovered.

SUMMARY

Implementations of the present disclosure are generally directed to identifying instances of fraud based on negotiable instruments by using a distributed ledger system. More particularly, implementations of the present disclosure are directed to using the distributed ledger system to identify instances of a negotiable instrument being deposited multiple times for payment, and alerting one or more financial institutions of such instances.

In general, innovative aspects of the subject matter described in this specification can be embodied in methods that include actions of receiving first information of a first negotiable instrument, at least a portion of the first information including a first unique instrument identifier physically encoded on the first negotiable instrument, the first unique identifier uniquely identifying the first negotiable instrument among a plurality of negotiable instruments, transmitting the first information to a distributed ledger system, the distributed ledger system maintaining a blockchain that records transactions associated with a plurality of negotiable instruments, receiving first validation information from the distributed ledger system, the first validation information indicating that first negotiable instrument has not already been accepted, and accepting the first negotiable in response to the first validation information. Other implementations of this aspect include corresponding systems, apparatus, and computer programs, configured to perform the actions of the methods, encoded on computer storage devices.

These and other implementations can each optionally include one or more of the following features: the first information is transmitted to the distributed ledger system in a transaction message including the first information, an indicator of an entity transmitting the transaction message, and a timestamp; the first unique identifier is encoded in a machine-readable code printed on the first negotiable instrument; actions further include transmitting a request for a ledger entry to the distributed ledger system in response to the first validation information, the distributed ledger system including at least the first information in a block that is added to the blockchain; the first negotiable instrument includes a check, and accepting the first negotiable instrument includes depositing the check; and actions further include receiving second information of a second negotiable instrument, at least a portion of the second information including a second unique instrument identifier physically encoded on the second negotiable instrument, the second unique identifier uniquely identifying the second negotiable instrument among the plurality of negotiable instruments, transmitting the second information to the distributed ledger system, receiving second validation information from the distributed ledger system, the second validation information indicating that second negotiable instrument has already been accepted, and denying the second negotiable in response to the first validation information.

These and other implementations can provide one or more advantages. In some examples, instances of fraud are reduced. In this manner, resources can be conserved. For example, computer resources required to unwind instances of fraud are conserved, as well as human resources. In some examples, customers and financial institutions are protected. For example, implementations of the present disclosure inhibit customers and/or financial institutions from being victims of fraud and losing funds. In some examples, consumer experience is improved as a result of the ability to increase transaction limits and capabilities. Further, operational costs are reduced as a result of a reduction of exception items that would be required to be handled.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 3A-4C depict an example interface for validating a negotiable instrument in accordance with implementations of the present disclosure.

DETAILED DESCRIPTION

Figure 1:
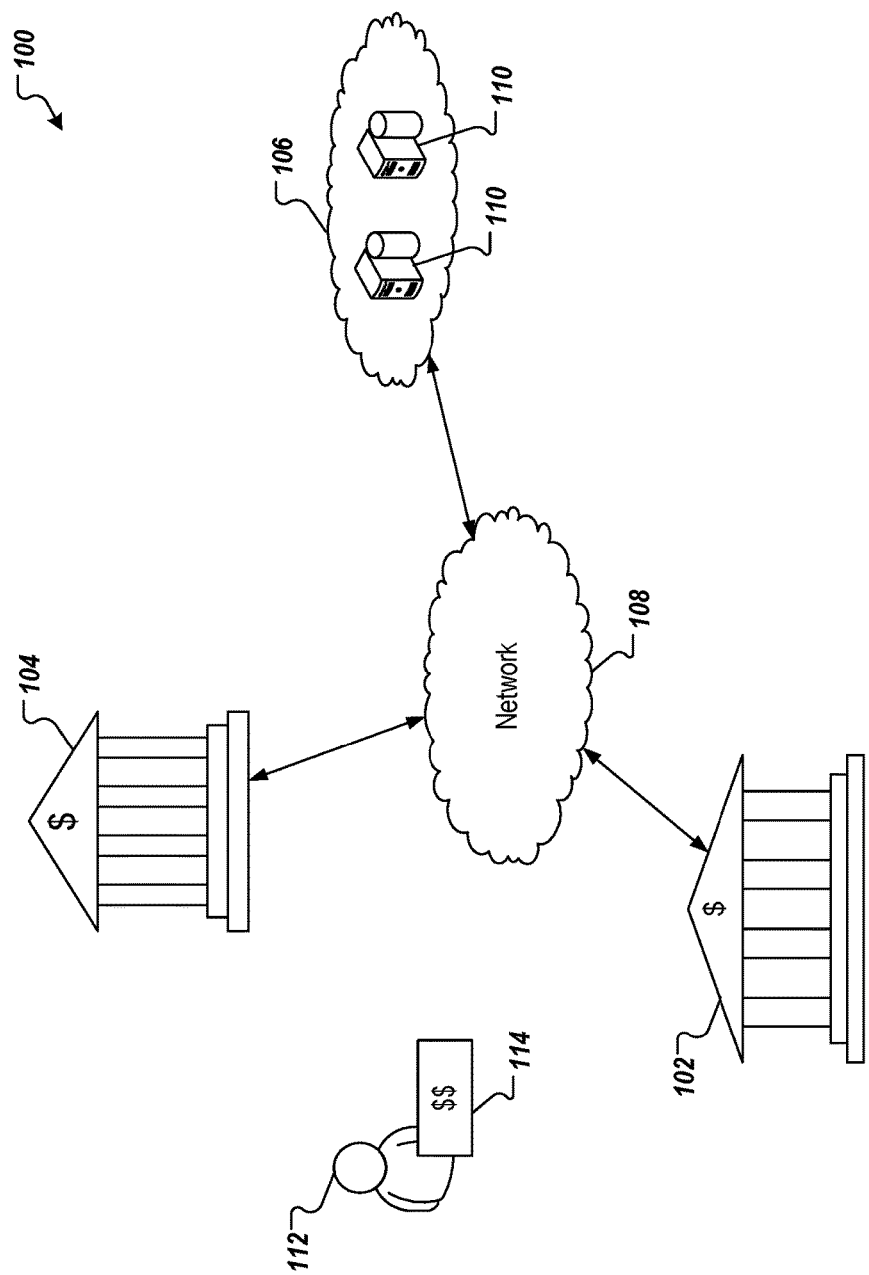
FIG. 1 depicts an example environment in accordance with implementations of the present disclosure.

Implementations of the present disclosure are generally directed to identifying instances of fraud based on negotiable instruments by using an immutable, distributed ledger system (referred to herein as a distributed ledger system). More particularly, implementations of the present disclosure are directed to using the distributed ledger system to identify instances of a negotiable instrument being deposited multiple times for payment, and alerting one or more financial institutions of such instances. In some implementations, and as described in further detail herein, the distributed ledger system maintains one or more blockchains, which are used to verify whether a negotiable instrument has already been presented (e.g., to a financial institution), when being presented (e.g., to a financial institution). In some examples, the distributed ledger system enables verification of the negotiable instrument to be conducted in real-time, near real-time, or in batch time.

As introduced above, a negotiable instrument is a written instrument (document) signed by an endorser (or maker), includes an unconditional promise to pay a certain amount of money, either on demand or at a future date, and is payable to the holder (or bearer). A person who becomes a holder in due course of a negotiable instrument by delivery, or by delivery and endorsement, has an unrestricted claim to the negotiable instrument. Example negotiable instruments include promissory notes, bills of exchange, banknotes, checks (e.g., personal, business, cashier, teller, treasury, government, certified, official, payment, loan), virtual checks, money orders, bill payments, proofs of payment, mobile payments (e.g., using smartphones, tablets, wearables), and instruments encoded in machine-readable codes (e.g., barcodes, QR codes).

In accordance with implementations of the present disclosure, and as described in further detail herein, each transaction associated with a negotiable instrument (e.g., deposit of a check with a financial institution) is verified/validated (e.g., checked for legitimacy) against the distributed ledger system, and if verified/validated, is entered into (recorded in) the distributed ledger system. In some examples, a transaction is validated using a cryptographic blockchain infrastructure (blockchain) of the distributed ledger system. In some implementations, the blockchain is an existing blockchain that is accessed by various networks. An example blockchain can include the Bitcoin blockchain. In some implementations, the blockchain is an application-specific blockchain (e.g., a blockchain that is dedicated to recording transactions of negotiable instruments). For example, the application-specific blockchain is a blockchain that is specifically provided for fraud detection (e.g., as opposed to a blockchain that is provided for numerous, different applications).

To provide further context for the present disclosure, a high-level discussion of blockchain technology is provided. In general, a blockchain is a public ledger of all transactions that have ever been executed in one or more contexts (e.g., negotiable instrument transactions, digital currency transactions). A blockchain constantly grows as completed blocks are added with a new set of transactions. In some examples, a single block is provided from multiple transactions (e.g., multiple deposits of different checks by different people). In general, blocks are added to the blockchain in a linear, chronological order by one or more computing devices in a peer-to-peer network of interconnected computing devices that execute a blockchain protocol. In short, the peer-to-peer network can be described as a plurality of interconnected nodes, each node being a computing device that uses a client to validate and relay transactions (e.g., deposits of checks). Each node maintains a copy of the blockchain, which is automatically downloaded to the node upon joining the peer-to-peer network. A blockchain protocol provides a secure and reliable method of updating the blockchain, copies of which are distributed across the peer-to-peer network, without the need for a central authority.

Because all users (e.g., financial institutions) need to know all previous transactions (e.g., check deposits) to validate a requested transaction (e.g., check deposit), all users must agree on which transactions have actually occurred, and in which order. That is, all users must come to a consensus. For example, if two users observe different transaction histories, they will be unable to come to the same conclusion regarding the validity of a transaction. In some examples, all users agree on the same rules used to validate transactions (e.g., as provided in the blockchain protocol), thus coming to a consensus. In some examples, a blockchain enables all users to come to an agreement as to transactions that have already occurred, and in which order. In short, and as described in further detail below, a ledger of transactions is agreed to based on the amount of work required to add a transaction to the ledger of transactions (e.g., add a block to the blockchain). In this context, the work is a task that is difficult (e.g., mathematically, computationally) for any single node (e.g., computing device) in the peer-to-peer network to quickly complete, but is relatively easy for a node (e.g., computing device) to verify.

The peer-to-peer network includes so-called miners (e.g., computing devices) that add blocks to a blockchain based on the blockchain protocol. In general, multiple miners validate transactions that are to be added to a block, and compete (e.g., perform work, as introduced above) to have their block added to the blockchain. Validation of transactions includes verifying digital signatures associated with respective transactions. For a block to be added to the blockchain, a miner must demonstrate a proof of work before their proposed block of transactions is accepted by the peer-to-peer network, and is added to the blockchain. A blockchain protocol includes a proof of work scheme that is based on a cryptographic hash function (CHF). An example CHF includes the secure hash algorithm 256 (SHA-256). In general, the CHF receives information as input, and provides a hash value as output, the hash value being of a predetermined length. For example, SHA-256 outputs a 256-bit (32-byte, 64-character) hash value. In some examples, the hash value is a one-way hash value, in that the hash value cannot be 'un-hashed' to determine what the input was. The blockchain protocol can require multiple pieces of information as input to the CHF. For example, the input to the CHF can include a reference to the previous (most recent) block in the blockchain, details of the transaction(s) that are to be included in the to be created block, and a nonce value (a random number used only once).

As introduced above, multiple nodes compete to hash a set of transactions and provide the next block that is to be added to the blockchain. The blockchain protocol provides a threshold hash to qualify a block to be added to the blockchain. For example, the threshold hash can include a predefined number of zeros (0's) that the hash value must have at the beginning (e.g., at least the first four characters of the hash value must each be zero). The higher the number of zeros, the more time-consuming it is to arrive at a qualifying hash value.

In accordance with the blockchain protocol, each miner in the peer-to-peer network receives transaction information for one or more transactions that are to be included in a block that is to be added next in the blockchain. Each miner provides the reference to the previous (most recent) block in the blockchain, details of the transaction(s) that are to be included in the to be created block, and the nonce value to the CHF to provide a hash value. If the hash value does not meet the threshold hash (e.g., the first four characters of the hash value are not each zero), the miner starts again to provide another hash value. If the hash value meets the threshold hash (e.g., at least the first four characters of the hash value are each zero), the respective miner successfully created the next block that is to be added to the blockchain. Consequently, the respective miner's block is broadcast across the peer-to-peer network. All other miners cease work (because one miner was already successful, and all other miners accept that block as valid), and all copies of the blockchain are updated across the peer-to-peer network to append the block to the blockchain. Each miner may be required to produce hundreds or thousands (or even millions, billions, or trillions) of hash values, before any one miner provides a qualifying hash value.

In some cases, the distributed ledger system can include one or more sidechains. A sidechain can be described as a blockchain that refrences data from other blockchains. In some examples, a sidechain enables ledger assets (e.g., a sidechain could settle an arrangement using the Bitcoin blockchain to transfer digital assets representing real or virtual assets) to be transferred between multiple blockchains. In some examples, when a user wants to transfer a virtual asset, the user broadcasts a message in real-time to the distributed ledger system (peer-to-peer network). The message is public and can reflect the transfer of assets right away, but usually users can wait for miners to verify the transaction, before relying on the transaction as valid.

FIG. 1 depicts an example environment 100, in which implementations of the present disclosure can be provided. In some examples, the example environment 100 includes a first financial institution 102, a second financial institution 104, a distributed ledger system 106, and a network 108. In some examples, each of the first financial institution 102 and the second financial institution 104 communicates with the distributed ledger system 106 through the network 108. For example, the first financial institution 102 and the second financial institution 104 can each include one or more computing devices (e.g., smartphone, tablet, laptop computer, desktop computer, server system) that communicate with one or more computing devices of the distributed ledger system 106. In some examples, the network 108 includes a local area network (LAN), wide area network (WAN), the Internet, or a combination thereof, and connects computing devices for communication therebetween. In some examples, the network 108 can be accessed over a wired and/or a wireless communications link(s). For example, mobile computing devices, such as smartphones can utilize a cellular network to access the network 108.

In some examples, the distributed ledger system 106 includes a plurality of computing devices (e.g., smartphone, tablet, laptop computer, desktop computer, server system). In the depicted example, the distributed ledger system 106 includes a plurality of server systems 110.

In the depicted example, a customer 112 is the bearer of a negotiable instrument 114 (e.g., a check). For example, the customer 112 can seek to deposit the negotiable instrument 114 with the first financial institution 102 and/or the second financial institution 104.

As introduced above, implementations of the present disclosure enable each transaction associated with a negotiable instrument (e.g., deposit of a check with a financial institution) to verify/validate (e.g., checked for legitimacy) against the distributed ledger system, and, if verified/validated, to be entered into (recorded in) the distributed ledger system. Implementations of the present disclosure are described in further detail below with reference to an example. The example is directed to detecting instances of attempts at multiple deposits of a check. It is contemplated, however, that implementations of the present disclosure can be realized in any appropriate context.

In some implementations, logic executing across the peer-to-peer network can create a private ledger within an existing ledger system. In accordance with implementations of the present disclosure, computer-executable program (e.g., application, script) is placed on the private ledger to validate/verify negotiable instrument transaction (e.g., checking for duplicate checks) by examining data submitted by the financial institutions (e.g., determine whether a check has already been deposited at another institution). In some examples, the program executes on top of already existing blockchains (or sidechains), and creates a private area of the blockchain that only the participating financial institutions are able to access and/or understand. For example, blockchains can be public or contain the same data across all peers, so rather than having private areas, a reference is provided on the blockchain to private data that only the parties who need can access and make use of.

In accordance with implementations of the present disclosure, when a financial institution deposits/cashes a check on behalf of its customer, the financial institution will input the check information and/or a unique instrument identifier, described in further detail herein, into the distributed ledger system. The distributed ledger system creates a unique hash (e.g., a digest of the information on the check, and/or the unique instrument identifier), and the hash is sent to a smart contract. In some examples, the smart contract is an entity, which is itself on the blockchain, and possesses the capability to perform logic. When the hash is sent to the smart contract, the smart contract not only assesses the data to ensure that the hash created from the check in question does not yet exist on the blockchain, but also stores this hash on the blockchain, to be sure any future queries for that specific hash will answer as expected. Accordingly, the check hash is stored on the smart contract, which is stored on the blockchain.

In some examples, notifications are sent to the participating financial institutions upon completing the validation/verification. For example, in the context of check deposits, if a duplicate check is found, an alert is transmitted to the participating financial institutions that the attempted check deposits were made. If the check is found to not have a duplicate, a confirmation is sent to the financial institution involved in the deposit, the confirmation indicating that the check is likely not fraudulent has not been fraudulently represented. In some examples, the notification can be used by the financial institution that the check was drawn on to reserve the funds within the account holder's account. This ensures that the account holder will not inadvertently use up the funds and the check will not bounce.

Figure 2A:
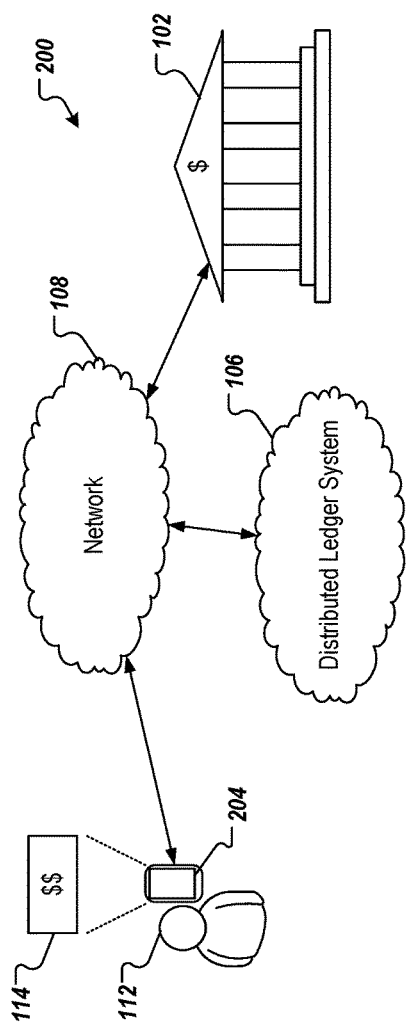
FIGS. 2A and 2B depict respective block diagrams collectively representing an example instance of multiple check deposits.
Figure 2B:
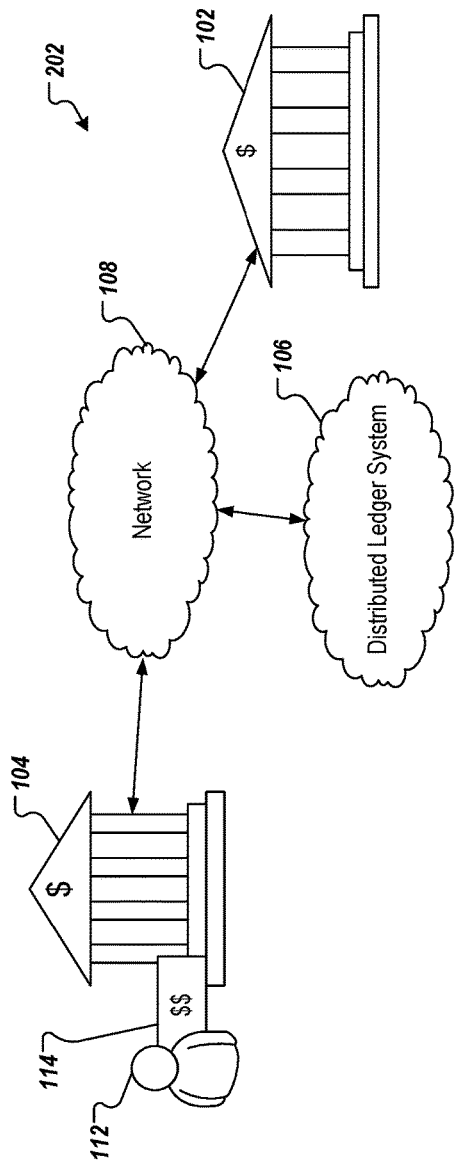

FIGS. 2A and 2B depict respective block diagrams 200, 202 collectively representing an example instance of multiple check deposits. With particular reference to FIG. 2A, and at a first time ($t_1$), the customer 112 (Bob) uses a computing device 204 (e.g., smartphone) to remotely deposit the negotiable instrument 114 (e.g., check) into an account with the first financial institution 102 (e.g., a fictional bank called We-R-Banks). For example, the computing device 204 executes a mobile check deposit application, which the customer 112 uses to capture one or more images of the negotiable instrument 114, and transfers transaction information, including the image(s), to the first financial institution 102. In some examples, the first financial institution 102 processes the transaction information to determine, for example, an identification string to be assigned to the check. In some examples, the identification string is based on the check information, such as account number, routing number, check number, and amount. For example, the negotiable instrument 114 is a check that includes the following example information:

Routing No.: 784432
Account No.: 7763542
Check No.: 21
Amount: $300.00

In some examples, the identification string is provided as a concatenation of the check information (e.g., 784432776354221300.00). In some examples, the identification string is based on the unique instrument identifier, as described in further detail herein.

In accordance with implementations of the present disclosure, the first financial institution 102 verifies the negotiable instrument 114 using the distributed ledger system 106 before depositing the funds in the customer's account. In some implementations, the first financial institution 102 transmits a transaction message to the distributed ledger system 106. In some examples, the transaction message includes the identification string, an address of the first financial institution 102, and a timestamp. In some examples, the address (e.g., a unique identifier) of the first financial institution 102 is provided as a unique identifier that uniquely identifies the first financial institution 102 among the financial institutions participating in the distributed ledger system 106 for verifying check integrity.

In some implementations, the distributed ledger system 106 (e.g., a computing device included in the distributed ledger system 106 (a node operating in the distributed ledger system 106)) receives the transaction message, and compares the identification string with a plurality of identification strings recorded in the distributed ledger system 106. When the transaction message is distributed to all nodes in the distributed ledger system 106, unique identifiers are compared (e.g., by miners) to look for collisions of the unique identifiers, which could be seen as possible fraudulence. In response to a collision, a node (e.g., a miner) can message financial institutions informing them and invalidating any 'bad' (duplicate) messages.

In the instant example, it is determined that the identification string is not already included in the plurality of identification strings. Consequently, it is determined that the negotiable instrument 114 has not already been deposited with a financial institution (at least as of the time $t_1$). In response, a confirmation message is transmitted to the first financial institution, the first confirmation message indicating that the negotiable instrument 114 has not already been previously deposited. The first financial institution deposits 102 deposits the negotiable instrument 114 and credits the customer's account.

Further, the distributed ledger (e.g., underlying blockchain) is updated to include the transaction (e.g., the deposit of the negotiable instrument 114 at the first financial institution 102). For example, the distributed ledger system 106 stores the transaction across all nodes in the distributed ledger system 106. Cryptographic checks are performed (e.g., the proofs of work described above) to ensure that the updated information is legitimate. That is, for example, the transaction is added to a block in the underlying blockchain.

Referring now to FIG. 2B, the customer 112 (the same customer, Bob, that already remotely deposited the negotiable instrument, as discussed above with reference to FIG. 2A) visits the second financial institution 104 to again deposit the negotiable instrument 114. Although the instant example includes the customer 112 visiting the second financial institution, the customer 112 could attempt to deposit the negotiable instrument 114 with the second financial institution 104 using a respective mobile application, as described above with reference to FIG. 2A. In some examples, the customer 112 hands the negotiable instrument 114 to a teller, and the teller inputs information into a computing device. For example, an interface can be provided, as discussed in further detail below, into which the teller inputs information. In another example, a device can be provided that captures one or more images of the negotiable instrument 114, which images can be scanned to determine the information. A transaction message is sent from the second financial institution 104 to the distributed ledger system 106. For example, the teller can interact with the interface to initiate transmission of the transaction message. As another example, the transaction message can be automatically transmitted in response to the image(s) being scanned and information determined.

In some implementations, the distributed ledger system 106 (e.g., a computing device included in the distributed ledger system 106) receives the transaction message, and compares the identification string with a plurality of identification strings recorded in the distributed ledger system 106. In the instant example, it is determined that the identification string is already included in the plurality of identification strings. Consequently, it is determined that the negotiable instrument 114 has already been deposited with another financial institution, namely, the first financial institution. In response, an alert message is transmitted to the second financial institution 104, the alert message indicating that the negotiable instrument 114 has already been deposited at another financial institution. In some examples, an alert message is also transmitted to the first financial institution 102.

In some implementations, the transaction of FIG. 2B, even though fraudulent, may be recorded in the distributed ledger system (e.g., included in a block of the underlying blockchain). In some examples, data can be recorded to indicate that there is a duplicate transaction and at least one of the transactions is likely invalid.

FIGS. 3A-4C depict an example interface 300 (e.g., dialog box) for validating a negotiable instrument in accordance with implementations of the present disclosure. Although FIGS. 3A-4C and the discussion herein provide for a user inputting information to the interface 300, it is appreciated that implementations of the present disclosure can be realized in other manners. In some examples, the processes described herein with reference to FIGS. 3A-4C and FIG. 6 can be automatically performed without the use of an interface. For example, information from a negotiable instrument can be read by a computing device (e.g., optical character recognition (OCR) based on an image of the negotiable instrument), and the information can be processed by one or more computing devices to perform the process(es) described herein.

With particular reference to FIGS. 3A-3C, the interface 300 can be used to verify a transaction (e.g., check deposit), as well as record the transaction in the distributed ledger system (e.g., add the transaction to a block of the underlying blockchain).

Referring now to FIG. 3A, the example interface 300 (e.g., a dialog box) includes a check information section 302 and a check verification section 304. In some examples, the check information section 302 includes a plurality of fields to input check information that is to be provided to the distributed ledger system. In the depicted example, a field 306 is provided to input the routing number of the check, a field 308 is provided to input the account number of the check, a field 310 is provided to input the check number of the check, and a field 312 is provided to input the amount of the check. A button 314 is provided to initiate transmission of a transaction message to the distributed ledger system. In the example of FIG. 3A, the button 314 is inactive (e.g., cannot be clicked), because information is absent from the fields 306, 308, 310, 312.

In some examples, the check verification section 304 includes a plurality of fields to display verification information based on information provided by the distributed ledger system. In the depicted example, a field 316 is provided to display a hash value provided for the check, a field 318 is provided to display an indication as to whether the check had already been deposited, a field 320 is provided to display a date/time at which the check had been deposited, if already deposited, and a field 322 is provided to display the financial institution that deposited the check, if already deposited. A button 324 is provided to initiate recordation of a check deposit with the distributed ledger system. In the example of FIG. 3A, the button 324 is inactive (e.g., cannot be clicked), because information is absent from the fields 316, 318.

Referring now to FIG. 3B, check information can be entered into the check information section 302 to determine whether a particular check is valid. In the depicted example, the routing number 1234567 is entered into the field 306, the account number 1234567890 is entered into the field 308, the check number 1001 is entered into the field 310, and the amount 1275.00 is entered into the field 312. In the example of FIG. 3B, the button 314 is active (e.g., can be clicked), because information is provided in each of the fields 306, 308, 310, 312. The button 314 can be activated (e.g., clicked on) to process the entered check information and determine whether the underlying check had already been deposited.

Referring now to FIG. 3C, the check verification section 304 displays check validation information based on the check information entered into the check information section 302, as described above with reference to FIG. 3B. In some examples, the check information is provided to the distributed ledger system, which processes the check information and returns the check validation information, as described herein. In the depicted example, the check validation information includes a check hash (e.g., a 256-bit, 32-byte number represented by a 64-byte character hash value) is displayed in the field 316, the word representing the Boolean value for True is displayed in the field 318, a date/time Jul. 30, 2015, 0945 (e.g., 9:45 AM) is displayed in the field 320, and the bank name Bank-is-Us is displayed in the field 322. Accordingly, in the example of FIG. 3C, the check had already been deposited at Bank-is-Us on Jul. 30, 2015 at 9:45 AM. In the depicted example, the button 324 is inactive (e.g., cannot be clicked on), because the check had already been deposited. In some examples, a notification can be sent to the bank Bank-is-Us in response to determining that the check had already been deposited.

Referring now to FIG. 4A, check information can be entered into the check information section 302 to determine whether a particular check is valid. In the depicted example, the routing number 784432 is entered into the field 306, the account number 7763542 is entered into the field 308, the check number 21 is entered into the field 310, and the amount 300.00 is entered into the field 312. In the example of FIG. 4A, the button 314 is active (e.g., can be clicked), because information is provided in each of the fields 306, 308, 310, 312. The button 314 can be activated (e.g., clicked on) to process the entered check information and determine whether the underlying check had already been deposited.

Figure 4B:
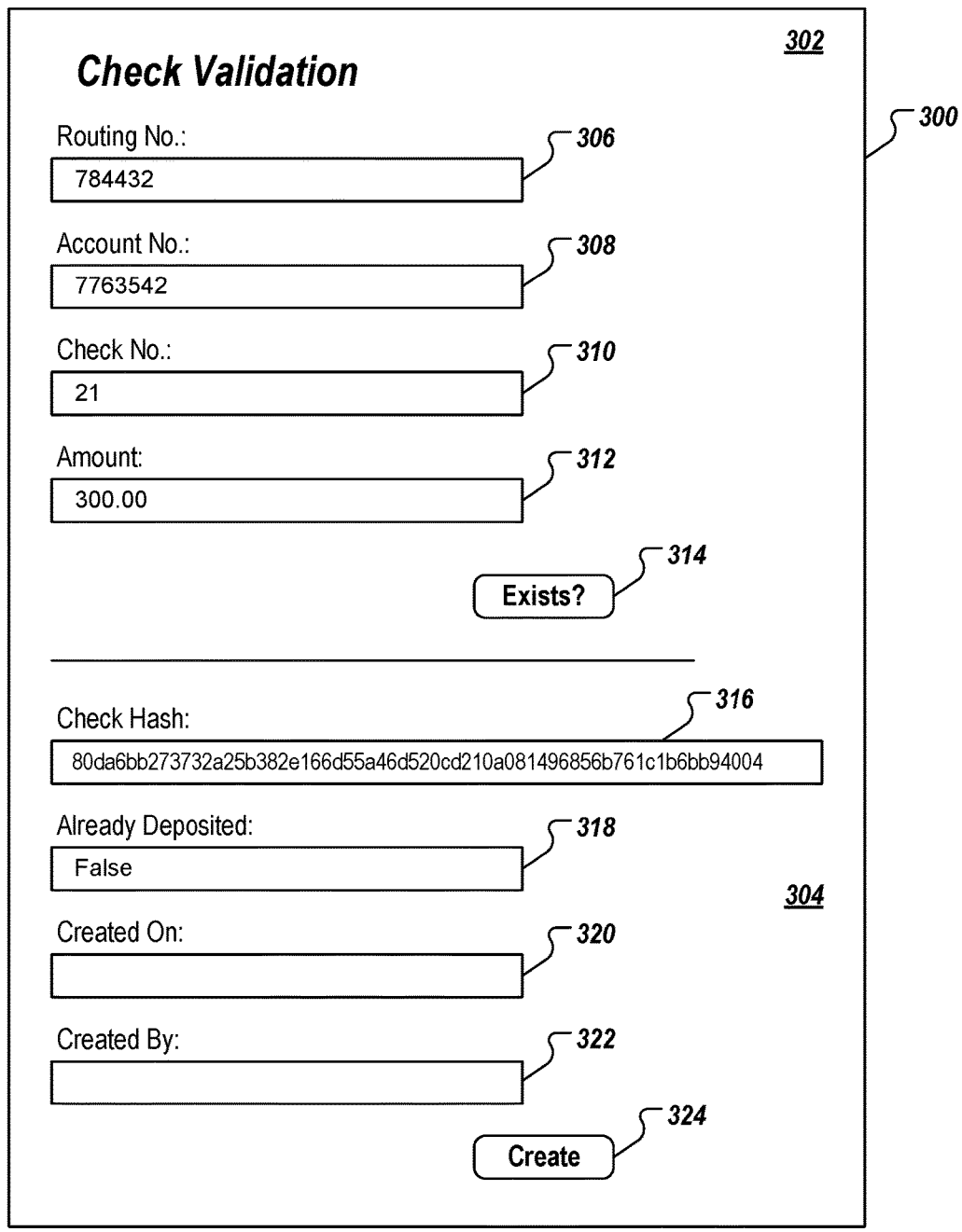

Referring now to FIG. 4B, the check verification section 304 displays check validation information based on the check information entered into the check information section 302. In some examples, the check information is provided to the distributed ledger system, which processes the check information and returns the check validation information, as described herein. In the depicted example, the check validation information includes a check hash (e.g., a 256-bit, 32-byte number represented as a 64-byte character hash value) displayed in the field 316, and the word representing the Boolean value for False displayed in the field 318. Accordingly, in the example of FIG. 4B, the check has not already been deposited (e.g., at least at a financial institution that participates in the distributed ledger system). In the depicted example, the button 324 is active (e.g., can be clicked on), because the check has not already been deposited. In some examples, the user can click on the button 324 to indicate that the check is to be entered into the distributed ledger system (e.g., the user will deposit the check).

Referring now to FIG. 4C, additional check validation information is displayed in the check validation section 304. In some examples, the additional check validation is displayed in response to the user clicking on the button 314 of FIG. 4B. For example, in response to the user clicking on the button 314, an instruction message can be provided to the distributed ledger system, which instructs the distributed ledger system to enter the check into the distributed ledger. In the depicted example, the additional check validation information includes the date/time Jul. 30, 2015, 1332 (e.g., 1:32 PM) displayed in the field 320, and the bank We-R-Banks displayed in the field 322. For example, the user can include a teller, who is employed at a branch of We-R-Banks. In response to the user clicking on the button 324 of FIG. 4B (e.g., on Jul. 30, 2015 at 1:32 PM), the check can be entered into the distributed ledger, and the additional check validation information is displayed (e.g., as shown in FIG. 4C).

Implementations of the present disclosure described above are based on the submission of information printed on the negotiable instrument (referred to above as check information). Example check information includes routing number, account number, and amount. This can be problematic, however. For example, manual typing of check information can result in inaccuracies, which would result in an indication that the negotiable instrument is valid (e.g., being deposited for the first time), when the negotiable instrument is actually invalid. As another example, although optical character recognition (OCR) can be used to automatically scan-in and identify check information, this can also result in errors in the check information being input.

Further, negotiable instruments, such as checks, do not have unique instrument identifiers that independently, uniquely identify the negotiable instrument among all negotiable instruments used in the marketplace. For example, although a check includes a routing number, account number, and a check number printed thereon, these numbers are not individually unique to a particular check. Although it could be argued that the routing number, the account number, and the check number could be considered unique in combination, that is not the case. For example, a customer can write checks from a checkbook that begins with an initial check number (e.g., 0001), and once the checkbook is empty of checks, can use a new checkbook to write checks, which also begins with the same initial check number (e.g., 0001).

Accordingly, implementations of the present disclosure provide a unique instrument identifier for each negotiable instrument issued by any and all financial service providers, such that every negotiable instrument is uniquely identifiable among every other negotiable instrument circulating in the marketplace. In some implementations, the unique instrument identifier is encoded in a machine-readable code that is printed on the negotiable instrument. Example machine-readable codes include, without limitation, a bar code, and a QR code.

In some implementations, the unique instrument identifier for a particular negotiable instrument is based on an identifier that is independent of the negotiable instrument. For example, a random number generator can be used to randomly generate an instrument identifier for each negotiable instrument. In some examples, the instrument identifier can be checked against an inventory of already assigned identifiers, and, if the instrument identifier has been already assigned to another negotiable instrument, a new instrument identifier can be generated, and checked. If the instrument identifier has not already been assigned to another negotiable instrument, the instrument identifier can be assigned to the negotiable instrument as a unique instrument identifier and can be added to the inventory to be checked against. In some implementations, the inventory of unique instrument identifiers can be maintained in the distributed ledger system.

In some implementations, the unique instrument identifier can be based on an identifier that is independent of the negotiable instrument, and information of the negotiable instrument (e.g., routing number, account number). For example, an instrument identifier, a routing number, and an account number can be concatenated, and a hash value can be determined, the hash value being the unique identifier (e.g., a 256-bit, 32-byte number represented as a 64-byte character hash value).

Figure 5:
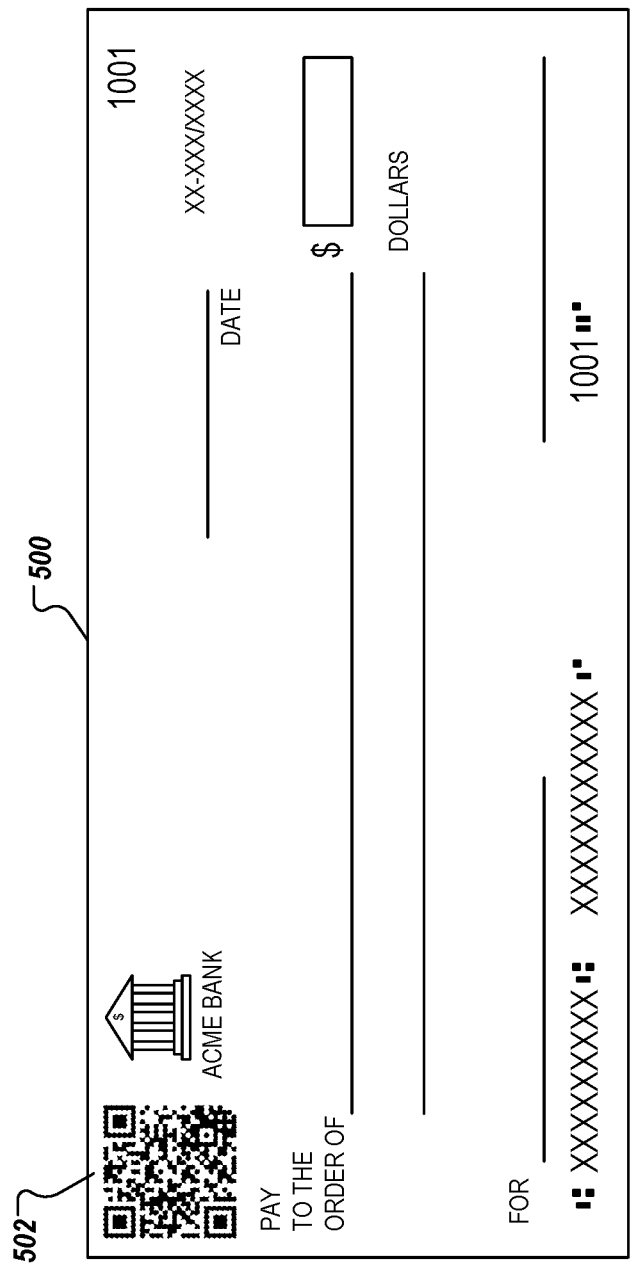
FIG. 5 depicts an example negotiable instrument including a unique identifier in accordance with implementations of the present disclosure.

FIG. 5 depicts an example negotiable instrument 500 including a machine-readable code 502 in accordance with implementations of the present disclosure. In some implementations, the machine-readable code 502 encodes a unique instrument identifier that uniquely identifies the negotiable instrument 500. In the depicted example, the machine-readable code 502 is provided as a QR code, although any appropriate machine-readable code can be used. In some examples, a code reader is used to decode the machine-readable code 502, and determine the unique instrument identifier encoded therein. For example, the code reader can capture an image of the machine-readable code 502, and process the image using Reed-Solomon error correction, for example, until the image can be appropriately interpreted. The unique instrument identifier is extracted from patterns that are present in both horizontal and vertical components of the image.

Figure 6:
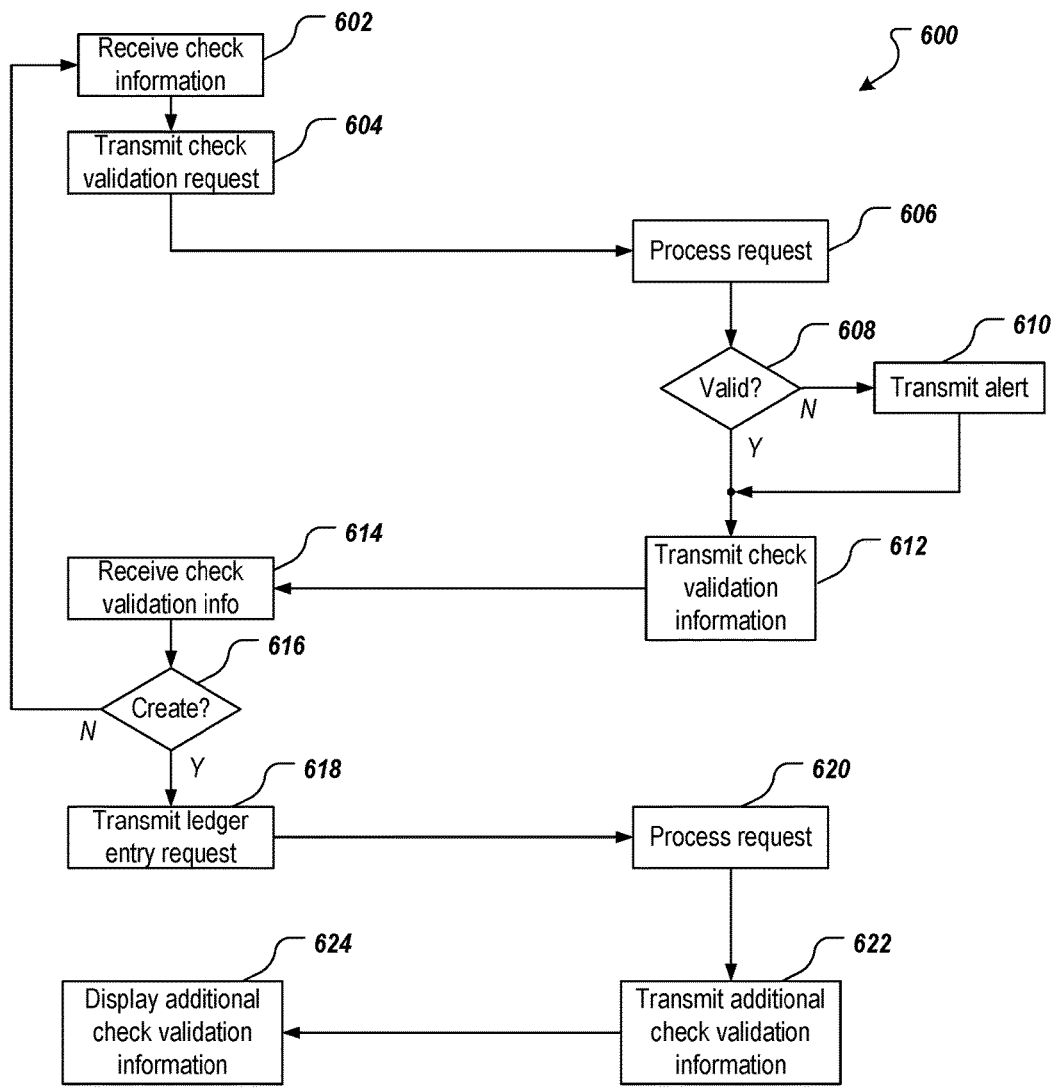
FIG. 6 depicts an example process that can be executed in accordance with implementations of the present disclosure.

FIG. 6 depicts an example process 600 that can be executed in accordance with implementations of the present disclosure. The example process 600 can be implemented, for example, by the example environment 100 of FIG. 1. In some examples, the example process 600 can be provided by one or more computer-executable programs executed using one or more computing devices.

Check information is received (602). For example, a financial institution receives check information for a check (negotiable instrument) that is to be deposited. In some examples, the check information is physically received at the financial institution (e.g., a customer visits a bank branch and presents the check), and a teller inputs the check information. In some examples, the teller types the check information into a user interface (e.g., the example interface 300 of FIGS. 3A-4C). In some examples, the teller uses a scanner to scan the check and the check information is read from an image of the check (e.g., using OCR). In some examples, the customer uses a mobile application executing on a computing device (e.g., a smartphone) to capture in image of the check and deposit the check remotely.

A check validation request is transmitted (604). For example, the financial institution transmits a check validation request (e.g., also referred to herein as a transaction message) to a distributed ledger system. In some examples, the check validation request includes an identification string (e.g., a concatenation of the check information, or any appropriate unique identifier of the check), an address (unique identifier) of the financial institution, and a timestamp. In some examples, the check validation request is transmitted in response to user input (e.g., the teller clicking on the button 314 of the interface 300). In some examples, the check validation request is automatically transmitted (e.g., in response to customer submission of the check using a mobile application executing on a smartphone).

The check validation request is processed (606). For example, the distributed ledger system receives the check validation request and processes the request to determine whether the check had already been deposited. It is determined whether the currently attempted check deposit is (presumably) valid (608). For example, if the check has not already been deposited, the currently attempted check deposit is valid, and check validation information is transmitted (612). For example, a check hash value and the word representing the Boolean value for False are transmitted to the financial institution to indicate that the check has not already been deposited (e.g., as depicted in FIG. 4B) at a participating financial institution. As another example, if the check had already been deposited, the currently attempted check deposit is not valid. Consequently, an alert is transmitted (610) and check validation information is transmitted (612). For example, an alert can be transmitted to the financial institution that had previously deposited the check, and a check hash value, the word True, the date/time of the earlier check deposit, and an indicator of the earlier financial institution are transmitted to the current financial institution to indicate that the check has already been deposited (e.g., as depicted in FIG. 3C).

The check validation information is received (614). For example, the financial institution that submitted the check validation request receives the check validation information. In some examples, the check validation information is displayed in a user interface (e.g., the interface 300). It is determined whether a ledger entry for the check is to be created (616). For example, if the check validation information indicates that the check had already been deposited, a ledger entry for the check (e.g., current attempt to deposit the check) is not created. As another example, if the check validation information indicates that the check has not already been deposited, a ledger entry for the check (e.g., current attempt to deposit the check) can be created. In some examples, a request for a ledger entry is transmitted (618). For example, the financial institution transmits the request to the distributed ledger system. In some examples, the request is transmitted in response to user input to an interface (e.g., the teller clicking on the button 324 of the interface 300). In some examples, the request is automatically transmitted (e.g., in response to the check validation information indicating that the check has not already been deposited).

The ledger entry request is processed (620). For example, the distributed ledger system processes the transaction information to add the check deposit to a block of the underlying blockchain, as described herein. Additional check validation information is transmitted (622). For example, the distributed ledger system transmits the additional check validation information to the financial institution after the ledger entry is completed. The additional check validation information is displayed (624). For example, the additional check validation information is displayed in an interface (e.g., the interface 300 as depicted in FIG. 4C).

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer can include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server. In a peer-to-peer network, a peer (e.g., computing device) act as both a client and server.

While this specification contains many specific implementation details, these should not be construed as limitations on the scope of any implementation of the present disclosure or of what may be claimed, but rather as descriptions of features specific to example implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method executed by at least one processor, the method comprising:
   receiving, by the at least one processor, first information of a first negotiable instrument, at least a portion of the first information comprising a first unique instrument identifier physically encoded on the first negotiable instrument, the first unique identifier uniquely identifying the first negotiable instrument among a plurality of negotiable instruments;
   requesting validation of the negotiable instrument using the first unique identifier, by; transmitting, by the at least one processor, the first information to a distributed ledger system, the distributed ledger system maintaining a blockchain that records transactions associated with a plurality of negotiable instruments;
   receiving, by the at least one processor, first validation information from the distributed ledger system, the first validation information indicating that the first negotiable instrument has not already been accepted; and
   accepting the first negotiable instrument m response to the first validation information.

2. The method of claim 1, wherein the first information is transmitted to the distributed ledger system in a transaction message comprising the first information, an indicator of an entity transmitting the transaction message, and a timestamp.

3. The method of claim 1, wherein the first unique identifier is encoded in a machine-readable code printed on the first negotiable instrument.

4. The method of claim 1, further comprising transmitting a request for a ledger entry to the distributed ledger system in response to the first validation information, the distributed ledger system including at least the first information in a block that is added to the blockchain.

5. The method of claim 1, wherein the first negotiable instrument comprises a check, and accepting the first negotiable instrument comprises depositing the check.

6. The method of claim 1, further comprising:
   receiving, by the at least one processor, second information of a second negotiable instrument, at least a portion of the second information comprising a second unique instrument identifier physically encoded on the second negotiable instrument, the second unique identifier uniquely identifying the second negotiable instrument among the plurality of negotiable instruments;
   transmitting, by the at least one processor, the second information to the distributed ledger system;
   receiving, by the at least one processor, second validation information from the distributed ledger system, the second validation information indicating that second negotiable instrument has already been accepted; and
   denying the second negotiable in response to the first validation information.

7. A system comprising:
   data store for storing data; and
   at least one processor configured to interact with the data store, the at least one processor being further configured to execute computer-readable instructions to perform operations comprising:

receiving first information of a first negotiable instrument, at least a portion of the first information comprising a first unique instrument identifier physically encoded on the first negotiable instrument, the first unique identifier uniquely identifying the first negotiable instrument among a plurality of negotiable instruments;

requesting validation of the negotiable instrument using the first unique identifier, by; transmitting, by the at least one processor, the first information to a distributed ledger system, the distributed ledger system maintaining a blockchain that records transactions associated with a plurality of negotiable instruments;

receiving first validation information from the distributed ledger system, the first validation information indicating that the first negotiable instrument has not already been accepted; and accepting the first negotiable instrument m response to the first validation information.

8. The system of claim 7, wherein the first information is transmitted to the distributed ledger system in a transaction message comprising the first information, an indicator of an entity transmitting the transaction message, and a timestamp.

9. The system of claim 7, wherein the first unique identifier is encoded in a machine-readable code printed on the first negotiable instrument.

10. The system of claim 7, wherein operations further comprise transmitting a request for a ledger entry to the distributed ledger system in response to the first validation information, the distributed ledger system including at least the first information in a block that is added to the blockchain.

11. The system of claim 7, wherein the first negotiable instrument comprises a check, and accepting the first negotiable instrument comprises depositing the check.

12. The method of claim 7, wherein operations further comprise:

receiving second information of a second negotiable instrument, at least a portion of the second information comprising a second unique instrument identifier physically encoded on the second negotiable instrument, the second unique identifier uniquely identifying the second negotiable instrument among the plurality of negotiable instruments;

transmitting the second information to the distributed ledger system;

receiving second validation information from the distributed ledger system, the second validation information indicating that second negotiable instrument has already been accepted; and denying the second negotiable in response to the first validation information.

13. A non-transitory computer-readable medium storing instructions that, when executed by at least one processor, cause the at least one processor to perform operations comprising:

receiving first information of a first negotiable instrument, at least a portion of the first information comprising a first unique instrument identifier physically encoded on the first negotiable instrument, the first unique identifier uniquely identifying the first negotiable instrument among a plurality of negotiable instruments;

requesting validation of the negotiable instrument using the first unique identifier, by; transmitting, by the at least one processor, the first information to a distributed ledger system, the distributed ledger system maintaining a blockchain that records transactions associated with a plurality of negotiable instruments;

receiving first validation information from the distributed ledger system, the first validation information indicating that the first negotiable instrument has not already been accepted; and accepting the first negotiable instrument m response to the first validation information.

14. The computer-readable medium of claim 13, wherein the first information is transmitted to the distributed ledger system in a transaction message comprising the first information, an indicator of an entity transmitting the transaction message, and a timestamp.

15. The computer-readable medium of claim 13, wherein the first unique identifier is encoded in a machine-readable code printed on the first negotiable instrument.

16. The computer-readable medium of claim 13, wherein operations further comprise transmitting a request for a ledger entry to the distributed ledger system in response to the first validation information, the distributed ledger system including at least the first information in a block that is added to the blockchain.

17. The computer-readable medium of claim 13, wherein the first negotiable instrument comprises a check, and accepting the first negotiable instrument comprises depositing the check.

18. The computer-readable medium of claim 13, wherein operations further comprise:

receiving second information of a second negotiable instrument, at least a portion of the second information comprising a second unique instrument identifier physically encoded on the second negotiable instrument, the second unique identifier uniquely identifying the second negotiable instrument among the plurality of negotiable instruments;

transmitting the second information to the distributed ledger system;

receiving second validation information from the distributed ledger system, the second validation information indicating that second negotiable instrument has already been accepted; and denying the second negotiable in response to the first validation information.

* * * * *